April 10, 1951 P. L. KAPITZA 2,548,377
MEANS FOR PRODUCING LIQUID AIR RICH IN OXYGEN
Filed Feb. 20, 1946
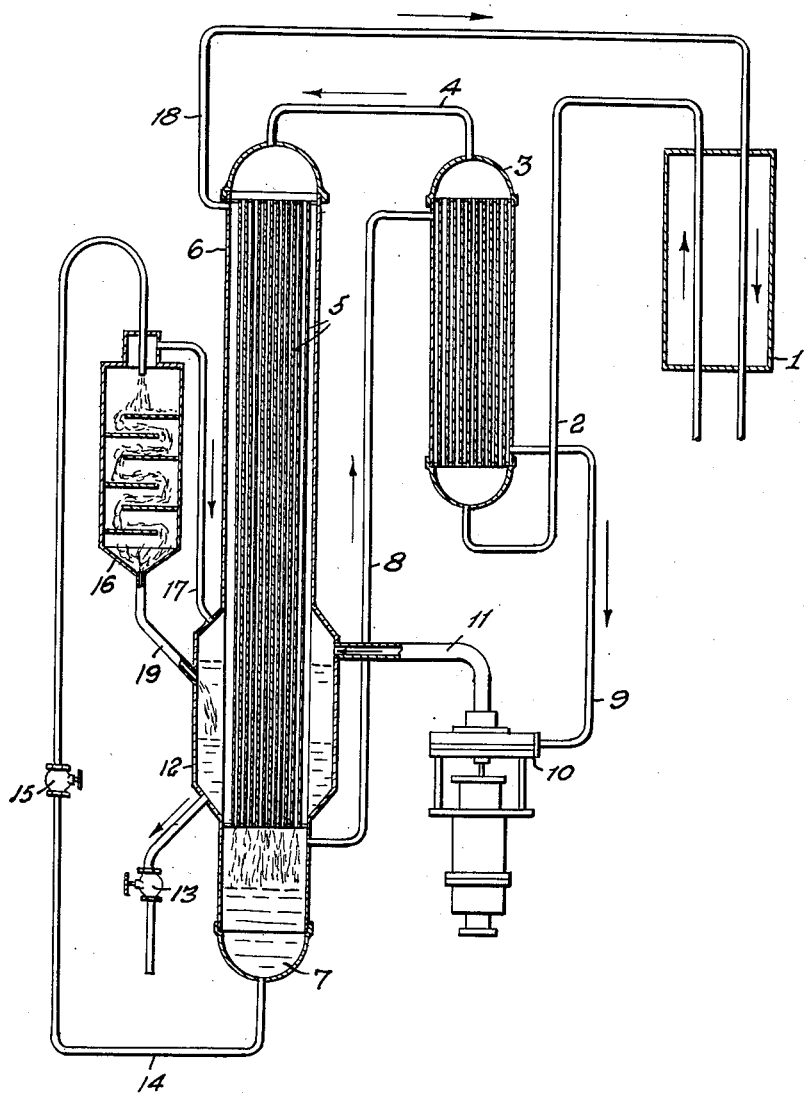
Inventor
Peter L. Kapitza

UNITED STATES PATENT OFFICE

2,548,377

MEANS FOR PRODUCING LIQUID AIR RICH IN OXYGEN

Peter Leonidovitch Kapitza, Moscow, Union of Soviet Socialist Republics

Application February 20, 1946, Serial No. 648,909 In the Union of Soviet Socialist Republics May 15, 1945

3 Claims. (Cl. 62—123)

The present invention relates to a method and means for producing liquid oxygen or liquid air containing an increased proportion of oxygen, by separating atmospheric oxygen from nitrogen in a process based on the difference of temperatures at which these components vaporize. The invention is further characterised by the use of low pressures of the order of 5 to 10 atmospheres and turbine expansion engines, which create the very low temperature necessary to liquefy part of the air passing through the apparatus.

The method is particularly advantageous when used in conjunction with a new, highly efficient type of turbine expansion engine (described in Patent No. 2,280,585 issued to the present inventor) instead of the usual reciprocating expansion engines.

In all prior methods known to applicant, practically all the oxygen contained in the air passing through the apparatus is liquefied and at least two stages of rectification are needed to obtain pure oxygen.

According to the present invention only 4–7% of the oxygen contained in the air being treated in the system and cooled to the desired temperature, is condensed in heat exchangers. The remaining oxygen is carried off by the uncondensed fraction of the air into a turbine expansion engine and after passing through heat exchangers, leaves the system.

At pressures between 5 and 10 atmospheres as used in the present method, the liquid phase of an oxygen-nitrogen mixture when in a state of equilibrium with the gaseous phase, contains 35–45% of oxygen, the remaining gaseous mixture retaining only 14–17% of oxygen as compared to the normal proportion of oxygen present in air of normal composition.

Commercially pure oxygen can be produced from a liquid phase containing 35–45% of oxygen with the use of only one rectifying stage and as a result the process and apparatus employed are considerably simplified. Thereby the cost of producing liquid oxygen by the proposed method is much reduced as compared with other known methods, in spite of the considerably larger volumes of air processed.

The drawing illustrates a schematic diagram of an embodiment of the apparatus for producing liquid oxygen according to the present invention.

The schematic diagram shows three heat exchanging systems designated by the figures 1, 3 and 6. Of these, the first (1) is preferably made in the form which serves to cool the air entering the system at a pressure of 5 to 10 atmospheres to a temperature of 110–130° K. The second heat exchanger (3) into which the cooled air from the first exchanger flows through pipe 2, cools the air to a lower temperature, while the final cooling to the dew point and the production of liquid air is performed in the tubes 5 of the third heat exchanger-condenser 6. The pipe 4 leads the air from the second to the third heat exchangers. These tubes 5 are cooled by a stream of air of lower temperature coming from the turbine expansion engine 10 in a direction opposite to that of the air being cooled.

The fraction liquefied in the tubes 5 as a result of the difference in temperatures of the cooling medium and the incoming air contains 35–45% of oxygen and is collected in the lower part 7 of the third heat exchanger. From this container 7, the liquid fraction flows through a pipe 14 having a valve 15, into a rectifier 16, this being either of the usual type of rectifying column with perforated plates or of a special design.

The liquid passes from the rectifying system 16 into an evaporator 12. It consists of liquid rectified oxygen. The rectification is performed by the evaporation of a certain amount of this oxygen, the gas evaporated passing back through pipe 19 to meet the flow of flux in the rectifier 16 and increases the oxygen content in the flux. The evaporation of the oxygen is due to the latent heat of evaporation of the gas being condensed in pipes 5 under the initial pressure. The condensate formed as a result of this is added to the main body of condensate flowing into the collector 7.

The remaining gaseous fraction of the cooled air which under the conditions of equilibrium between the liquid and gaeous phases in chamber 7 contains only 14 to 17% of the normal amount of oxygen in the atmosphere, passes through pipe 8 into the space surrounding the tubes of heat exchanger 3 and after its temperature has risen due to the exchange of heat to very nearly that at which the air leaves the heat exchange device 1 (i. e. about 110–130° K.), it is directed into the expansion turbine 10. In this engine the gaseous fraction is expanded to a pressure slightly higher than atmospheric pressure (1,1 atm.). At the same time, the temperature drops to about 94° K. (−179° C.) as a result of the power expended on the shaft of the expansion turbine. The exhaust air from the turbine, having the temperature and pressure mentioned above, is directed through pipe 11 into the space surrounding the tubes 5 of the heat exchanging system or condenser 6. The cold gas cools the incoming air to form the desired liquid phase and then passes through pipe 18 into the heat exchange device 1 where it gives up all its cold and after this is exhausted into the atmosphere.

The amount of oxygen evaporated in the container 12, and consequently, the production of liquid oxygen of any desired degree of purity depends upon the area of the evaporator tubes 5 coming into contact with the liquid phase. This is very easily achieved by varying the level of the liquid in the chamber 12 by controlling the quantity of purified liquid oxygen delivered through the valve 13. By this means it is possible to obtain pure liquid oxygen.

The flow of compressed air in the tubes 5 may be reversed, i. e. the air may be directed upwards. Due to partial dephlegmation the percentage of oxygen in the condensate flowing into the collector 7 may be somewhat increased and the operation of the whole system will be improved. However such an increased efficiency involves a considerable complication of the whole apparatus requiring an increase in the number of tubes 5 in order to reduce the speed of flow of air in the upward stream and to prevent part of the condensate being carried off by the compressed air entering the expansion turbine and consequently the adoption of a dephlegmating device is not worth while.

Apart from the above mentioned advantages it should be pointed out, that the whole system is very easily controlled, this control being effected by the operation of the valves 15 and 13, the first (15) of which controls the level of the condensate in the container 7 and the supply of flux to the rectifying apparatus 16, while the second one (13) controls the level of the liquid in the container 12 and, consequently the amount of gaseous oxygen flowing back into the rectifying apparatus.

A further feature of the proposed system is that the air passing into the expansion turbine is previously cooled to a low temperature at which no carbon dioxide can be deposited inside the turbine and clog it. Any trace of carbonic acid gas which passes through the heat exchanger 1 is condensed in the tubes of heat exchanger 3 and condenser 6 so that the air entering into the turbine 10 is practically free of any traces of carbon dioxide.

Highly efficient rectifying systems and the expansion turbines are the subjects of separate patent applications and are mentioned here only in so far as is necessary to explain the process by which liquid oxygen and liquid air with an increased percentage of oxygen content are produced.

Since details of a method and means for producing liquid oxygen or liquid air rich in oxygen may be modified, the scope of the invention is defined by the claims as hereunto appended.

I claim:

1. Apparatus for producing liquid oxygen or liquid air containing oxygen comprising, a primary heat exchange device, a secondary heat exchange device, conduit means guiding air from the primary heat exchange device to said secondary heat exchange device, a heat exchange condenser, conduit means guiding air from the secondary heat exchange device into said heat exchange condenser, an evaporator, a collector receiving liquid from said heat exchange condenser, a rectifying device, conduit means guiding liquid from the collector to an upper portion of the rectifier, a pipe connecting a lower part of the rectifier with said evaporator, an expansion turbine delivering an expanded gaseous fraction from the collector into heat exchange relationship with the air in said heat exchange condenser, means guiding said expanded fraction from the heat exchange condenser into heat exchange relationship with the air in said primary heat exchange device, and conduit means connected to an inlet of the turbine receiving a gaseous fraction from said collector.

2. Apparatus for producing liquid oxygen or liquid air containing oxygen comprising, a primary heat exchange device, a secondary heat exchange device, conduit means guiding air from the primary heat exchange device to said secondary heat exchange device, a heat exchange condenser, conduit means guiding air from the secondary heat exchange device into said heat exchange condenser, an evaporator, a collector receiving liquid from said heat exchange condenser, a rectifying device, conduit means guiding liquid from the collector to an upper portion of the rectifier, a pipe connecting a lower part of the rectifier with said evaporator, conduit means conveying a gaseous fraction from the collector into heat exchange relationship with the air passing through the secondary heat exchange device, an expansion turbine, a pipe guiding the gaseous fraction from the secondary heat exchange device to an inlet of said turbine, and a conduit connecting the discharge side of said expansion turbine to the heat exchange condenser.

3. Apparatus for producing liquid oxygen or liquid air containing oxygen comprising, a primary heat exchange device, a secondary heat exchange device, conduit means guiding air from the primary heat exchange device to said secondary heat exchange device, a heat exchange condenser, conduit means guiding air from the secondary heat exchange device into said heat exchange condenser, an evaporator surrounding the lower portion of said heat exchange condenser, a collector receiving liquid from said heat exchange condenser, a rectifying device, conduit means guiding liquid from the collector to an upper portion of the rectifier, conduit means connecting the lower part of the rectifier in open communication with an upper portion of said evaporator, conduit means guiding a gaseous fraction from the upper part of said collector into heat exchange relationship with the air passing through the secondary heat exchange device, an expansion turbine, a pipe guiding the gaseous fraction from the secondary heat exchange device to an inlet of the turbine, means directing the expanded gaseous fraction from the turbine into heat exchange relationship with the air in said heat exchange condenser, and means guiding said expanded gaseous fraction into heat exchange relationship with the air passing through the primary heat exchange device.

PETER LEONIDOVITCH KAPITZA.

REFERENCES CITED

The following references are of record in the file of this patent:

UNITED STATES PATENTS

| Number | Name | Date |
| --- | --- | --- |
| 1,354,056 | Norton | Sept. 28, 1920 |
| 1,678,485 | Schlitt et al. | July 24, 1928 |

OTHER REFERENCES

"The Separation of Gases" by Ruhemann, published by the Oxford Press, page 44.